Sept. 23, 1930.  B. BOYKIN, JR  1,776,649
OSCILLATING HANGER FOR PITMEN
Filed June 19, 1926  2 Sheets-Sheet 1
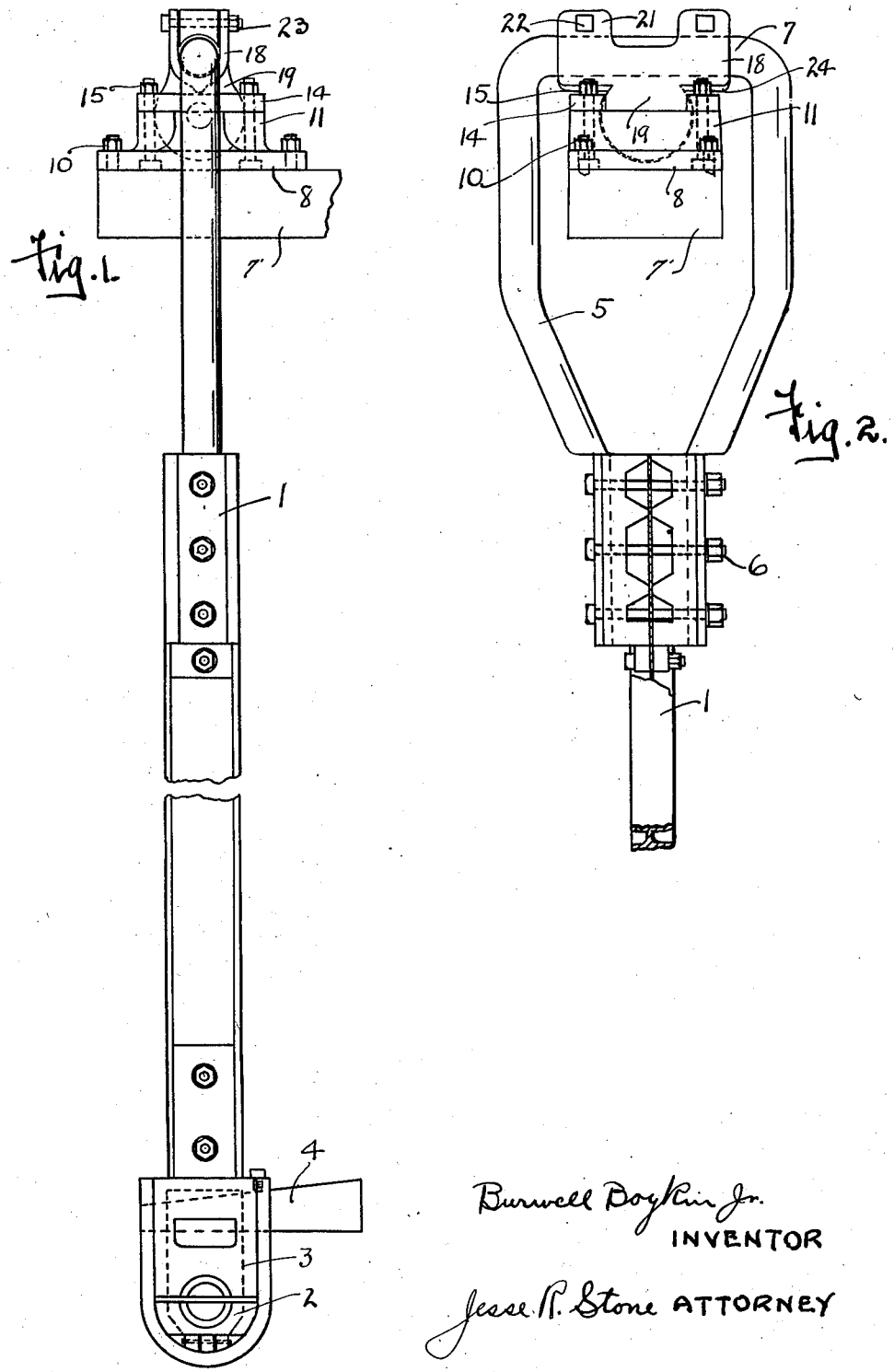

Sept. 23, 1930.      B. BOYKIN, JR      1,776,649
OSCILLATING HANGER FOR PITMEN
Filed June 19, 1926      2 Sheets-Sheet 2

Burwell Boykin Jr.
Jesse R. Stone

INVENTOR

ATTORNEY

Patented Sept. 23, 1930

1,776,649

UNITED STATES PATENT OFFICE

BURWELL BOYKIN, JR., OF BEAUMONT, TEXAS

OSCILLATING HANGER FOR PITMEN

Application filed June 19, 1926. Serial No. 117,004.

My invention relates to a holder or hanger for a pitman such as is employed as a connecting rod between a walking beam and a rotating crank arm.

In the usual apparatus now employed in making the connection between the pitman and a walking beam, the yoke at the end of the pitman is fitted over a metal plate or saddle on the beam. The difficulty experienced with such a connection is that the pitman is restricted from movement in a plane at an angle to the plane in which the beam rocks. Thus, in removing the pitman from the crank arm, the lower end of the pitman cannot be swung laterally to move it free from the wrist pin without springing or straining the rod. It also leads to difficulty where the pump rod or drilling rod, which is to be reciprocated, is out of the direct line below the plane of the beam. The pitman is strained out of position so that friction and excessive wear result.

It is an object of my invention to provide an attachment between the pitman and beam which will be strong, but also adapted to allow the free operation of the walking beam, even when it is out of alignment with the crank arm. It is desired that the lower end of the pitman be free to swing a limited degree in any lateral plane without straining the pitman or its connection with the walking beam.

Figure 3:
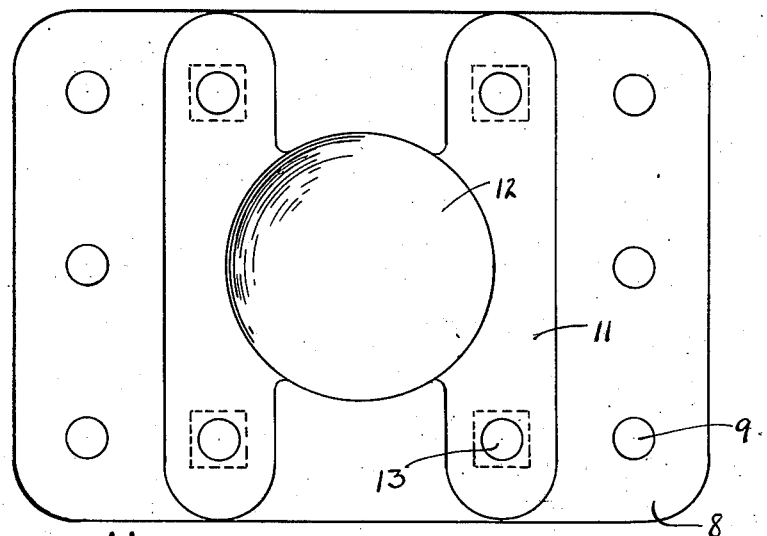
Figures 4, 5, 6:
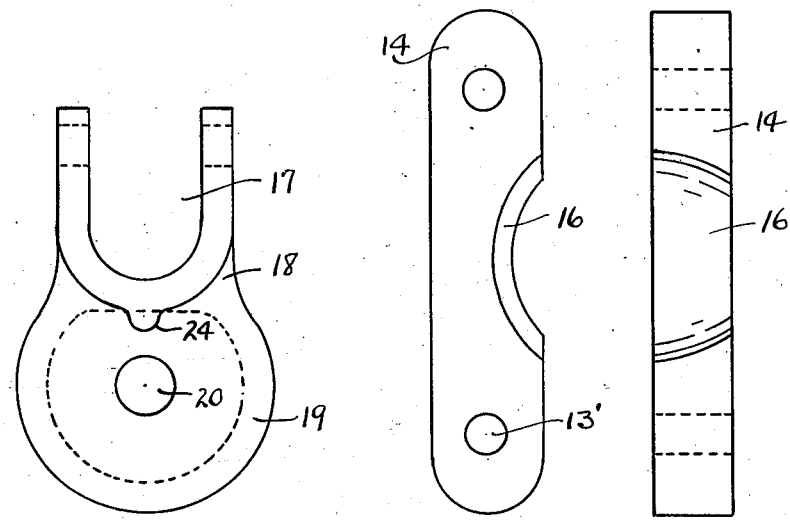

Referring to the drawing herewith, Fig. 1 is a side elevation of a pitman and the attaching plate embodying my invention shown in position upon the walking beam. Fig. 2 is a front elevation of the upper end of the pitman, shown as engaging the saddle and walking beam employed in my invention. Fig. 3 is a top plan view of the bearing plate. Fig. 4 is an end elevation of the saddle. Fig. 5 is a top plan view of one of the clamping plates, and Fig. 6 is a side elevation of the plate shown in Fig. 5. Like numerals of reference are employed to designate like parts in all the views.

In illustrating my invention, I have shown a pitman 1 of H iron, or similar construction, the lower end of which has bearing members 2 and 3 adapted to fit about the wrist pin upon a rotating crank arm. A key 4 serves to hold the bearing members in position. This construction is not a part of the present invention and need not be further described.

The upper end of the pitman has thereon a yoke 5, shaped approximately in the form of an inverted U, the lower arms of which are bolted at 6 to the upper end of the pitman 1. The upper end of the yoke has a horizontal portion 7 which is adapted to be supported above the upper end of the walking beam 7'.

To receive the yoke 7 and allow its swinging movement relative to the beam in all directions, I have provided a bearing plate 8. The construction of this bearing plate is shown in elevation in Fig. 3. It comprises a base plate, the lower face of which is flattened to rest upon the upper end of the walking beam. There are a plurality of marginal openings 9 therein through which bolts 10 may pass for the purpose of securing the plate firmly to the beam.

Approximately centrally of the plate are two spaced, upwardly extending bosses, or lugs, 11, said bosses having between them a socket 12 constructed in an approximately spherical form, so as to accommodate a ball, which may fit therein. The ends of each of the bosses are provided with openings 13 to receive connecting bolts, which will be presently mentioned.

On the upper ends of the bosses, previously described, I place two opposite clamping plates 14, shown in Figs. 5 and 6. These plates have openings 13' in their ends to register with the openings 13 in the bosses to receive clamping bolts 15. The inner sides of the clamping plates 14 are cut away at 16 to form a portion of a spherical socket and are adapted to register with socket 12. It will thus be seen that when the plates are clamped in position on the upper faces of the bosses 11, the recesses 16 in the sides of the clamping plates will conform to the outline of the socket 12.

The cross member 7 of the yoke of the pitman is received within a channel 17 in the upper end of a saddle 18. The said saddle has on its lower side a ball member 19, the lower portion of which is spherical in shape and adapted to fit within the socket 12 in the bearing member. Said ball has its interior hollow, as shown in dotted lines in Fig. 4, and a diametrical opening 20 through the ball allows for the reception of lubricant and makes it possible to cast this member in the process of manufacture.

The channelled seat 17, which receives the yoke, extends slightly above the yoke at each end, forming ears 21 which have openings 22 therein to receive locking bolts 23 to retain the yoke in position. The lower face of the saddle at each side of the ball member of the bearing has a strengthening rib 24 to assist in preventing wear upon the structure, and it is to be understood that this strengthening rib is formed to be spaced above the clamping plates 14 when the saddle is placed in position in the bearing, thus allowing the saddle to rock laterally, as well as forwardly and backwardly, in the operation of the pitman.

In the operation of the pitman having my improved connection with the walking beam, the force of the downward stroke of the pitman, which is the power stroke in the operation of pumping or drilling, the load will be exerted downwardly upon the saddle and the beam, the weight resting upon the bearing member formed by the ball 19 within the bearing socket 12 and the clamping plate 16. By forming a ball and a socket bearing member at this point, the yoke will be allowed to swing forwardly and backwardly relative to the walking beam, in the usual manner, and will also have a comparatively free movement in lateral or intermediate directions. This will be of material advantage in that the walking beam 7' does not have to be directly above the crank arm of the operating mechanism, for the pitman may have a lateral inclination in operation without materially affecting its efficiency. This will take up for any variation in alignment of the apparatus which is apt to occur during the operation of the walking beam.

It is a further advantage that the lower end of the pitman may be swung free of the wrist pin without any strain upon the pitman, thus the upper bearing member 3 at the lower end of the pitman may be removed and the pitman may be then swung away from the crank arm and off the end of the wrist pin without difficulty and without any danger of injury to the pitman itself or to the bearing at the upper end. This construction is simple and economical to manufacture and will greatly facilitate the efficient operation of standard rigs.

Having thus described my invention, what I claim as new and desire to protect by Letters Patent is:

1. A pitman holder for use on walking beams comprising a bearing plate adapted to be mounted on a walking beam, clamping plates detachably connected therewith, said bearing plate and said clamping plates having a socket, a saddle, a ball member on said saddle fitting said socket, a pitman yoke adapted to be connected to a pitman and a seat on the saddle receiving said yoke.

2. A pitman holder for use on walking beams comprising a bearing plate adapted to be mounted on the upper side of a walking beam, said plate having a socket of spherical formation therein, a saddle having a ball fitting said socket, a yoke adapted to be connected to a pitman fitting over the end of the beam, and a seat in said saddle receiving said yoke.

3. A pitman holder for use on walking beams comprising a bearing plate adapted to be mounted on a walking beam, said plate having a spherical socket, a saddle having a ball fitting said socket, a yoke adapted to be attached to a pitman, said saddle having a channelled seat receiving said yoke.

4. A pitman holder for use on a walking beam including a bearing plate adapted to be mounted on a beam, a yoke for connection with a pitman, and a saddle on said bearing plate receiving said yoke, said saddle having a universal bearing on said plate.

5. A pitman holder adapted for use on walking beams, said pitman holder comprising a bearing plate adapted to be mounted on the upper side of the beam and a ball and socket connection, a yoke adapted to be attached to a pitman and means on said holder to receive said yoke whereby universal movement of the pitman is permitted.

In testimony whereof I hereunto affix my signature this 14th day of June, A. D. 1926.

BURWELL BOYKIN, Jr.